United States Patent
Waters et al.

[19]

[11] Patent Number: 6,166,520
[45] Date of Patent: Dec. 26, 2000

[54] INTERCELL BUSSING SYSTEM FOR BATTERY PACK

[75] Inventors: John Eugene Waters, Fishers; Brad T. Hanauer, Muncie, both of Ind.

[73] Assignee: Delphi Technologies, Inc., Troy, Mich.

[21] Appl. No.: 09/491,241

[22] Filed: Jan. 25, 2000

[51] Int. Cl.[7] .................................................... H02J 7/00
[52] U.S. Cl. .............................................. 320/107; 429/99
[58] Field of Search .............................. 320/107; 429/96, 429/97, 98, 99, 100

[56] References Cited

U.S. PATENT DOCUMENTS

| | | | |
|---|---|---|---|
| 4,993,973 | 2/1991 | Selinko | 429/96 |
| 5,795,675 | 8/1998 | Maglica | 429/99 |
| 5,820,406 | 10/1998 | Hetherington | 429/98 |

*Primary Examiner*—Peter S. Wong
*Assistant Examiner*—Lawrence Luk
*Attorney, Agent, or Firm*—Margaret A. Dobrowitsky

[57] ABSTRACT

Disclosed is an intercell buss system 10 comprising:

at least a pair of electrical cells 12, 14, each having an electrical terminal 12A, 14B thereon;

a lid 18 having an up and a down position, such that in the down position, the lid covers at least a portion of the terminals of the cells; further, the lid has a projection 20 thereon; and a current carrying member 16 located on the projection 20 of the lid 18 such that when the lid is in the down position electrical current can pass from one cell to the other through the current carrying member which acts as an intercell buss and when the lid is in the up position, no current can pass through the current carrying member.

8 Claims, 1 Drawing Sheet

INTERCELL BUSSING SYSTEM FOR BATTERY PACK

FIELD OF THE INVENTION

The invention pertains to an intercell buss system for a battery pack and in particular, a system which incorporates inherent safety features.

BACKGROUND OF THE INVENTION

Interconnections between batteries have been utilized for many years, depending upon the battery system utilized. Many connections require a unique configuration where the battery fits within a specific designed position with a spring engagement for connecting the bottom of one battery to other batteries. Such an arrangement is utilized in many C or D batteries in flashlights and the like.

Other cable interconnects are used with ring terminals with specially designed spliced in signal circuits. Alternatively, buss bars between batteries are bolted on to keep a battery in place with the intercell buss.

It is an object of the present invention to provide an intercell buss system for at least a pair of electrical cells where the buss between the electrical cells can simultaneously connect the cells and disconnect the cells from a safety perspective by being incorporated in a lid covering the battery pack. It is also an object of the present invention to have the intercell buss connection which simultaneously connects the cells and at the same time electrically connects a sense lead so that one would be able to identify the operability of the cells.

SUMMARY OF THE INVENTION

Described is an intercell buss system comprising:

at least a pair of electrical cells, each having an electrical terminal thereon;

a lid having an up and a down position, such that in the down position, the lid covers a portion of the terminals of the cells; further, the lid has a projection thereon; and a current carrying member located on the projection of the lid such that when the lid is in the down position electrical current can pass from one cell to the other through the current carrying member which acts as an intercell buss and when the lid is in the up position, no current can pass through the current carrying member.

DESCRIPTION OF PREFERRED EMBODIMENTS

Figure 1:
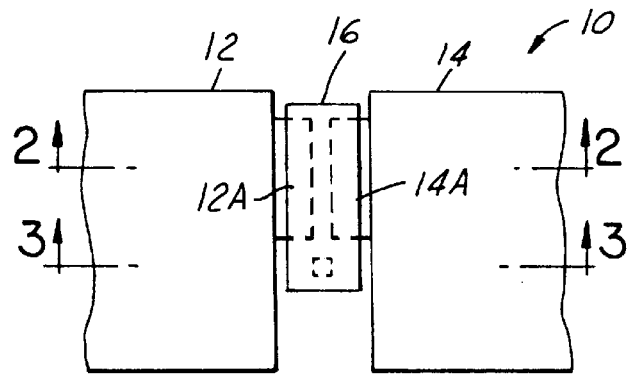
FIG. 1 is a top sectional perspective view of the intercell buss contact between a pair of cells.
Figure 2:
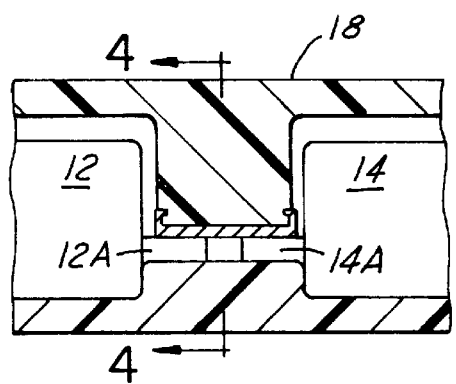
FIG. 2 is a sectional view taken along line 2—2 of FIG. 1 showing the intercell buss connection.
Figure 3:
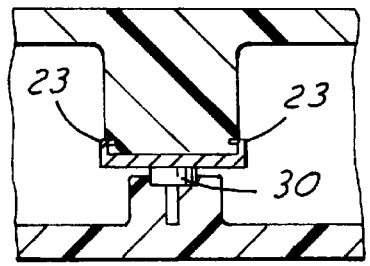
FIG. 3 is a side sectional view taken along line 3—3 of FIG. 1 showing the intercell sense connection.
Figure 4:
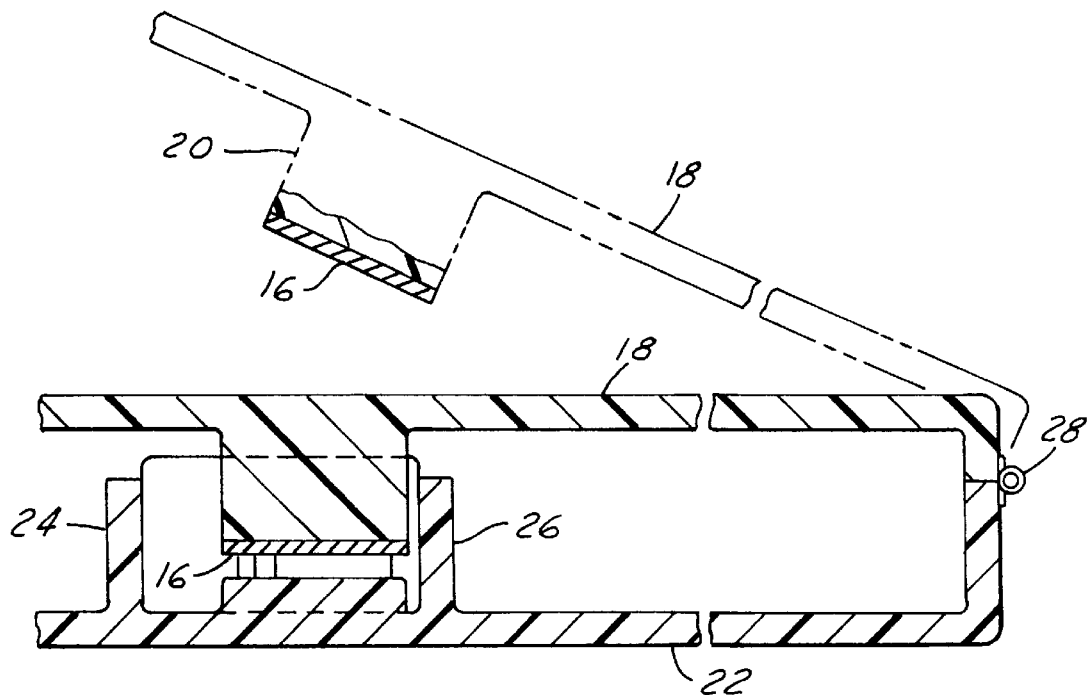
FIG. 4 is taken along line 4—4 of FIG. 2 and is a sectional perspective view of a the battery pack in a closed position and in outline in the open position where the cover is hinged to the battery tray.

The present invention is directed towards an intercell buss system 10 showing at least a pair of electrical cells 12 and 14. While only two cells are shown, the number can increase depending on the desired end use of the battery pack.

The buss 16 overlaps and connects the cell terminal ends 12A and 14A. The buss is an electrically conductive material such as aluminum or its alloys or copper based materials and is retained in the lid projection 20 by retaining members 23. The battery cells 12 and 14 fit within a tray 22 and are retained in position by upright members 24 and 26. The lid 18 may be hinged about member 28. Obviously any technique for a lid may be used besides a hinge such as a freely moveable top and the like.

When the lid 18 closes about the battery pack it makes an electrical connection through buss 16. Simultaneously, it makes an electrical connection with lead member 30. The lead member permits sensing of the connection with an external lead or circuit (not shown). The battery pack material can be made up of a variety of materials such as metal or plastic, such as polypropylene, polyethylene, ABS and the like.

During the battery pack assembly, it is desirable to insert the cells along a path perpendicular to the axis of the cell. The axis runs through the cell from one terminal to the other. This development allows this cell path during assembly.

The cells may be placed into a battery pack tray 22 and captured by a connector 16. The buss connector 16 is integrated into a lid or cover as is shown in the Figures. The cover or lid 18 provides a contact point, a hold down force and interconnects the two cells simultaneously.

For safety considerations, it is desirable to disable the battery pack if the enclosure is open. The device shown herein allows the intercell bussing to be mounted in the lid so that if the lid is on the pack, the pack will be disabled when the lid is opened.

In addition, the connection to the sense lead 30 is made with the same part. At the same time that there is a power connection there is contact with multiple contact points.

The battery has particular applicability to the lithium polymer batteries, such as 42 volt battery pack system. Obviously, however, it is applicable to a wide variety of electrical cells such as conventional lead acid cells. In addition, it would be applicable for other secondary or rechargeable batteries as well as primary batteries and fuel cells where such intercell connection is desirable.

It is to be appreciated that the bussing system described herein is modular in design. One can add battery packs to fit the desired voltage, e.g. 12 volts to 48 to 144 volts, and the like.

As can be seen, the battery pack and the intercell connection permits easy assembly into strings or packs without tools being necessary. The cell terminals 12 and 14 can be the same as for a side-by-side cell orientation since no customization of the cell is required for a flat pack application. This bussing system allows for universal cell terminals. The size of the terminals can vary and accordingly can permit high current capacity as well as low resistance. The invention as described herein reduces tolerance stack up and tolerates minor misalignment of the cells. This can be handled by virtue of the geometric arrangement and the size of the intercell connector 16.

By virtue of the connector 16 and the sense lead 30 arrangement as shown in the drawings herein, the connector and lead can be keyed to provide positive rejection of improperly oriented cells. In other words, the mechanical relationship between the buss and the cell terminals will permit a detection of whether the cell has been inserted correctly.

Due to the arrangement of the cell connector in the lid, there is no need for fasteners or torque control of fasteners nor the use of the cables or a single wire spliced into a cable. No tools are necessary to assemble and disassemble the electrical connection.

While the forms of the invention herein disclosed constitute presently preferred embodiments, many others are possible. It is not intended herein to mention all of the possible equivalent forms or ramifications of the invention. It is understood that the terms used herein are merely descriptive, rather than limiting, and that various changes may be made without departing from the spirit or scope of the invention.

What is claimed is:

1. An intercell buss system comprising:

at least a pair of electrical cells, each having an electrical terminal thereon;

a lid having an up and a down position, such that in the down position, the lid covers at least a portion of the terminals of the cells; further, the lid has a projection thereon; and a current carrying member located on the projection of the lid such that when the lid is in the down position electrical current can pass from one cell to the other through the current carrying member which acts as an intercell buss and when the lid is in the up position, no current can pass through the current carrying member.

2. The system of claim 1 wherein the cells are positioned in a tray with a sensing lead between at least two cells;

wherein the lead contacts the current carrying member buss when the lid is in the down position and there is no contact with the current carrying member when the lid is in the up position.

3. The system of claim 1 wherein the cells are flat in a tray.

4. The system of claim 1 wherein the lid covers the cells.

5. The system of claim 1 wherein the cells are flat in a tray and the lid encloses the tray.

6. The system of claim 1 wherein the cells are in a tray and can be removed therefrom when the lid is in the open position.

7. An intercell buss system comprising:

at least a pair of electrical cells, each having an electrical terminal thereon;

a lid having an up and a down position, such that in the down position, the lid covers the terminals of the cells; further, the lid has a projection thereon; and wherein the cells are positioned to lie flat in a tray having a sensing lead between at least two cells;

wherein the lead contacts the current carrying member buss when the lid is in the down position and there is no contact with the current carrying member when the lid is in the up position;

wherein the lid covers the cells and encloses the tray; and wherein the cells can be removed from the tray when the lid is in the open position.

8. A method of assembling and disassembling the electrical connection between at least a pair of electrical cells comprising:

providing at least a pair of electrical cells, each having an electrical terminal thereon;

a lid having an up and a down position, such that in the down position, the lid covers a portion of the terminals of the cells; further, the lid has a projection thereon; and a current carrying member located on the projection of the lid such that when the lid is in the down position electrical current can pass from one cell to the other through the current carrying member which acts as an intercell buss and when the lid is in the up position, no current can pass through the current carrying member;

moving the lid into a down position thereby providing intercell connection between the electrical terminals of each of the electrical cells; and placing the lid in the up position, thereby breaking the electrical circuit between the electrical cells.

* * * * *